United States Patent [19]

Stantial

[11] 3,865,366

[45] Feb. 11, 1975

[54] VARIABLE MOTION PEDAL ASSEMBLY FOR A FOOT-POWERED VEHICLE

[76] Inventor: Charles T. Stantial, Station Rd., Campbell Hall, N.Y. 10916

[22] Filed: Jan. 28, 1975

[21] Appl. No.: 437,153

[52] U.S. Cl. ..................... 272/73, 74/594.3, 74/560
[51] Int. Cl. ............................................. A63b 21/00
[58] Field of Search ....... 74/560, 512, 594.2, 594.3; 272/73, 57 D

[56] References Cited
UNITED STATES PATENTS

| | | | |
|---|---|---|---|
| 571,753 | 11/1896 | Decker | 74/594.3 |
| 2,184,049 | 12/1939 | Lienhard | 74/594.3 |

Primary Examiner—Benjamin W. Wyche
Assistant Examiner—Frank H. McKenzie, Jr.

[57] ABSTRACT

A pedal of an exercise bicycle or other foot-powered vehicle is coupled to the crank of its drive sprocket through a motion-changing assembly that substitutes a complex curvilinear pedal path for the normal orbiting motion. The assembly includes a housing with a plurality of gear-coupled shafts that are independently supported for rotation. A pair of the shafts are fixed to the crank and pedal, respectively. The rotation of the pedal shaft about its axis proportionately rotates the plane of symmetry of the curvilinear pedal path when the vehicle is driven with the pedal shaft angle held fixed at its new position.

11 Claims, 8 Drawing Figures

VARIABLE MOTION PEDAL ASSEMBLY FOR A FOOT-POWERED VEHICLE

BACKGROUND OF THE INVENTION

In a conventional foot-powered vehicle such as a bicycle, at least one drive sprocket is mounted on a first axle journalled for rotation about a main axis of the bicycle frame. The drive sprocket is conventionally chain-coupled to a second sprocket affixed to a wheel of the vehicle, either directly or through gearing controllable by suitable levers.

In order to transmit motion from the vehicle operator's foot to the first axle, the end of a crank affixed to the drive sprocket is conventionally secured to the spindle of a foot pedal. The usual movement of the operator's foot imparts to the pedal an orbiting rotational motion about the main axis, while the crank simultaneously defines a corresponding circular path about such axis.

In general, the constant repetitive orbiting motion of the foot tends to be boring and monotonous, particularly on long trips. Such weariness and tedium are only partially overcome when geared bicycles are used, since even when the gears are shifted, the motion of the foot (although subject to greater or lesser resistance due to the changed gear ratio) remains basically the same. This problem is often more serious in the case of exercise bicycles of the type generally prescribed by physicians for cardio-vascular therapy. It is not uncommon for a physician to prescribe from 15 to 20 minutes of pedaling at a rapid speed. The monotony of an invariant orbiting foot motion during pedaling for such periods, particularly in the fixed environment called for, often induces a patient to discontinue such therapy long before its benefits can be realized.

Several workers in the field have in the past devised pedaling schemes which differ from the normal repetitive orbiting motion. These schemes have been primarily directed toward increasing the mechanical advantage of the operator's foot during the power stroke. This is accomplished, e.g., by lengthening the effective torque arm about the main axis during such stroke, the torque arm being normally equal to the length of the crank.

Even in such arrangements, it is virtually impossible to adjust the pedal path dynamically to obtain the above-mentioned psychological relief of monotony while pedaling for long periods. Instead, it is necessary to physically decouple one or more of the relatively moving parts of the pedal assembly and to thereafter reposition them in a new orientation. Each such operation is time consuming and requires the use of a wrench or other hand tool. Moreover, once such adjustment is made, the pedal path cannot be changed again until a subsequent mechanical adjustment of the same type is made.

SUMMARY OF THE INVENTION

These disadvantages are overcome with the motion-changing pedal arrangement of the present invention. In general, such arrangement includes a housing in which two or more gear-coupled shafts are independently supported for rotation and disposed in parallel spaced relation. A pair of the shafts extend in respectively opposite directions through the housing so that one shaft may be received in a threaded hole at the end of the drive crank while the other shaft is affixed to the pedal.

Different gear-coupling arrangements for the shafts are set forth in separate illustrative embodiments to provide spiral, elliptical and cardioidal-circular pedal path configurations each having a particular plane of symmetry. In each case, a rotation imparted to the pedal-engaging shaft about its own axis will impart a corresponding rotation of the plane of symmetry of the pedal path without the necessity of mechanical adjustments.

BRIEF DESCRIPTION OF THE DRAWING

The invention is further set forth in the following detailed description taken in conjunction with the appended drawing, in which.

DETAILED DESCRIPTION

Figure 1:
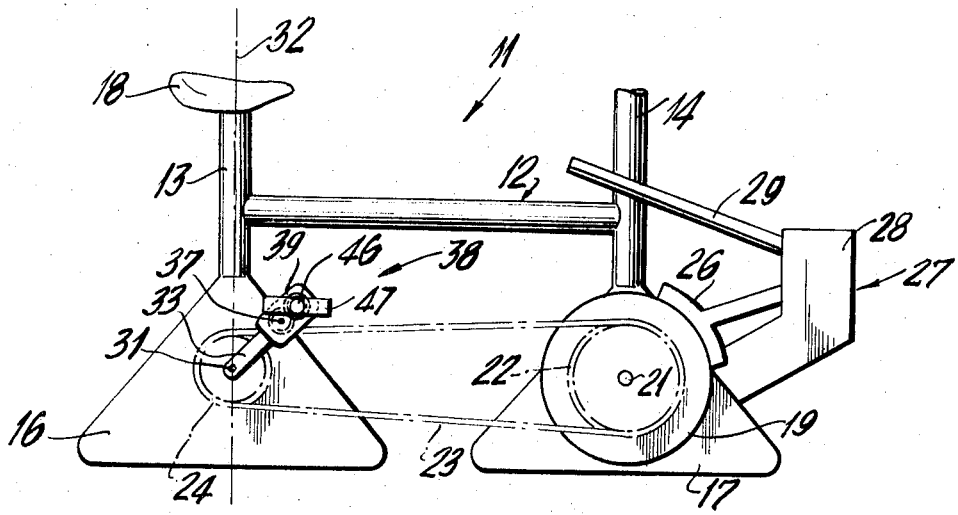
FIG. 1 is an elevation view, partly broken away, of a portion of an exercise bicycle employing a variable-motion pedal assembly in accordance with the invention.

Referring now to FIG. 1 of the drawing, the invention is illustrated in particular connection with an exercise bicycle 11, although it will be understood that it has corresponding application to other types of foot-powered vehicles. In the figure, certain parts (such as the handle-bar assembly) of bicycle 11 are omitted for simplicity of description. The bicycle includes a frame 12 having interconnected front and rear standards 13 and 14 supported by delta-shaped floor mounts 16 and 17. A conventional seat 18 is mounted on the rear standard 13. A drum 19 is affixed to a front axle 21 supported for rotation in the front mount 17. The drum 19 is also coaxially affixed to a front sprocket 22 which is coupled via a chain 23 to a rear drive sprocket 24.

An adjustable friction shoe 26 bears against the drum 19 for applying varying amounts of drag thereon during operation of the bicycle. The bearing pressure of the shoe against the drum is adjustable via a conventional lever assembly 27 movably supported in a receptacle 28 affixed to the front mount 17. The lever assembly 27 has projecting control arm 29 which permits the vehicle operator to adjust the drag on the bicycle in accordance with medically prescribed requirements.

It will be understood that suitable calibration and/or read-out devices may be provided as required to permit the operator to set the required load quantitatively.

Figure 2:
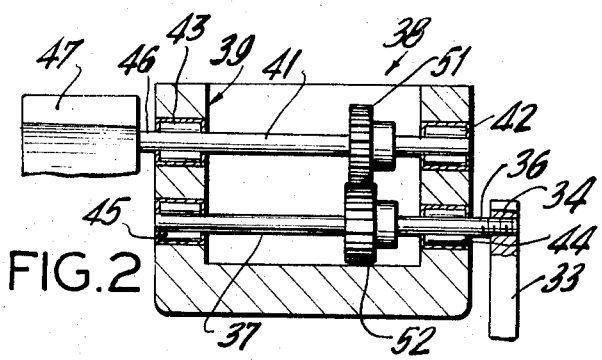
FIG. 2 is a side view of one embodiment of the pedal assembly of the invention.

The rear sprocket 24 is affixed to a rear drive axle 31 which is supported for rotation on the rear mount 16 in registration with a fixed vertical axis 32. The end of a crank 33 of the rear sprocket 24 is provided with a threaded hole 34 (FIG. 2) which fixedly receives a threaded projecting end 36 of a first shaft 37 carried in a variable-motion pedal assembly 38. With this connection, relative motion between the crank 33 and the shaft 37 is precluded.

The assembly 38 includes a housing 39 which supports the shaft 37 together with a second shaft 41 in parallel spaced relation. The shafts 37 and 41 are individually journalled for rotation in bearing sets 42, 43 and 44, 45, respectively. A projecting end 46 of the shaft 41 extends through the housing 39 in a direction opposite to that of the projection 36. The projection 46 is affixed to a pedal 47 in such a manner that relative movement between the pedal and the shaft 41 is precluded.

The shafts 37 and 41 individually carry a pair of externally toothed gears 51 and 52 in meshing relation, the gears having a 1 : 1 gear ratio. With this arrangement, since the shafts 37 and 41 are individually supported for rotation by the housing 39 and are individually affixed to the crank 33 and the pedal 47, a torque applied by an operator's foot to the pedal 47 will be transmitted through the housing 39 to the crank 33. Accordingly, the crank will be driven in its constrained circular path about the axis of the rear axle 31 (FIG. 1) while the housing 39 pivots about the axis of the shaft 37. With the 1 : 1 gear ratio depicted, the path of the pedal 47 will define a spiral curve shown in FIG. 3. As indicated, two rotations of the crank 33 will trace out a complete repetitive pattern of the spiral.

Illustratively, with the pedal held horizontal by the operator's foot during the entire pedal travel as shown, the axis of symmetry of the spiral path coincides with the rear vertical axis 32 of the bicycle.

It is evident that the additional components of motion present when substituting a spiral path for the usual circular orbiting path of the pedal provides an additional degree of exercise for the operator which may have important therapeutic advantages. Moreover, and in further accordance with the invention, such components of motion added by the spiral path may be quickly and easily varied by the operator without the necessity of mechanical adjustments to the bicycle.

Figure 3:
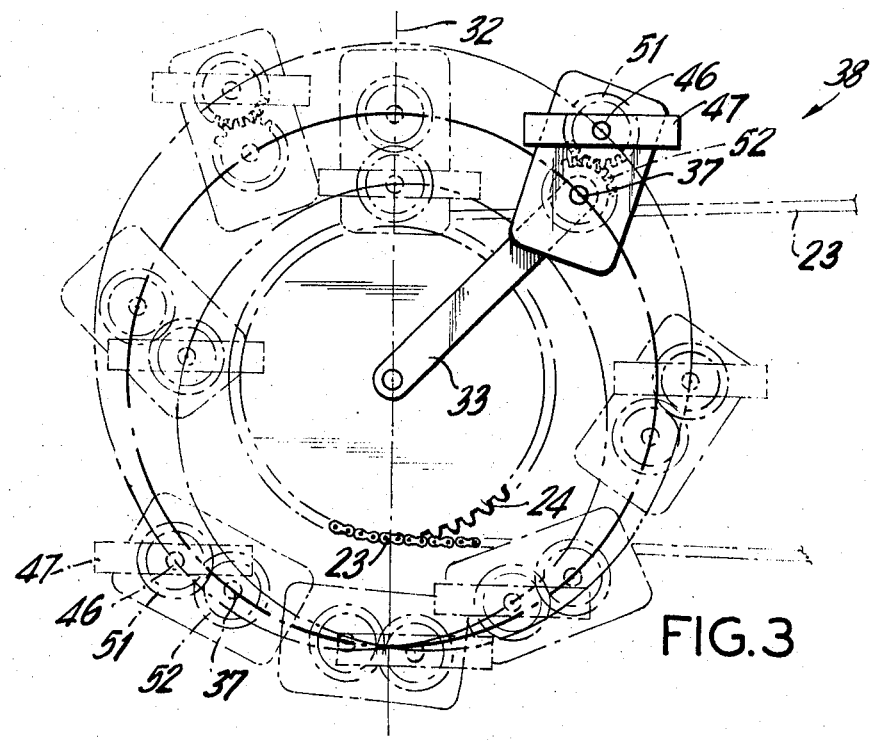
FIGS. 3 - 4 are respective pictorial diagrams illustrating the shapes of the pedal paths of a vehicle employing the pedal assembly of FIG. 2 when the pedal is oriented at two different angles.
Figure 4:
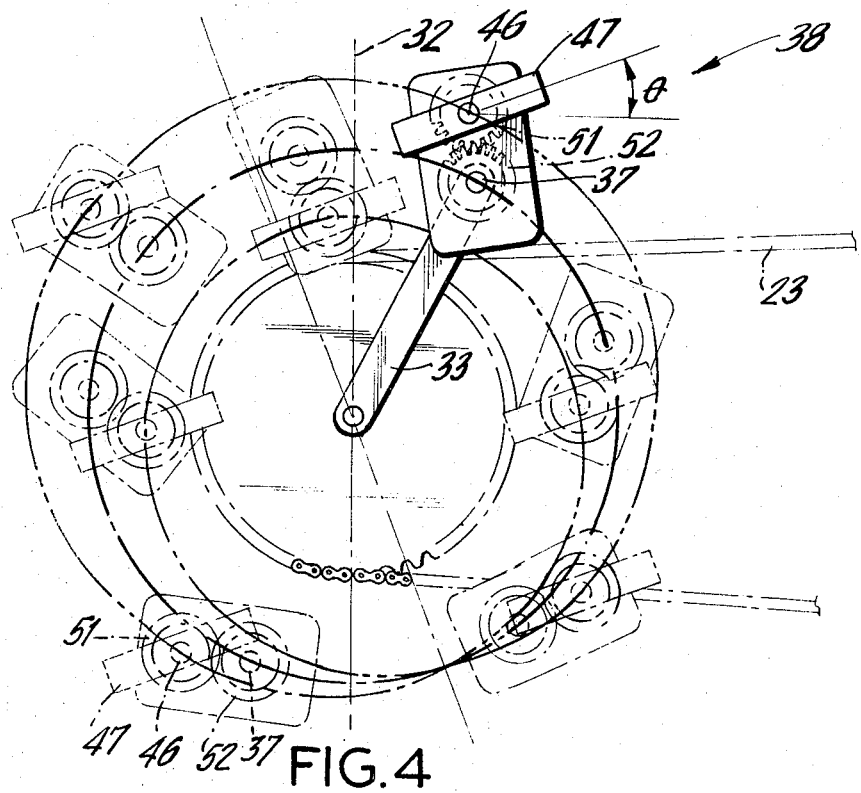

In particular, if the shaft 41 is rotated about its own axis in either direction from the position shown in FIG. 3 (which may be done by a simple rotation of the operator's ankle while the pedal is engaged), the gear 52 associated with the pedal shaft 41 will "ride" up or down the gear 51 on the shaft 37 to a new angular position, e.g., to the position shown in FIG. 4. As noted by a comparison of FIGS. 3 and 4, the orientation of the axis of symmetry of the spiral path will deviate angularly from the vertical axis 32 by an amount determined by the degree and sense of the deviation of the pedal angle from its original horizontal position. Once such new orientation of the spiral is established, it will be maintained so long as the operator keeps his foot in the new position while pedaling the vehicle.

Such ease and flexibility in changing the components of motion, and thereby the rhythm, of the pedal path is a particularly significant factor in avoiding operator fatigue and boredom when the vehicle is operated for long periods. In addition, since while pedaling various components of the ankle, calf and thigh are tensioned to different degrees depending on the pedal angle selected, the facilities provided by the invention for adjusting the pedal angle also provide a convenient and flexible way of exercising and strengthening the lower extremities.

Figure 5:
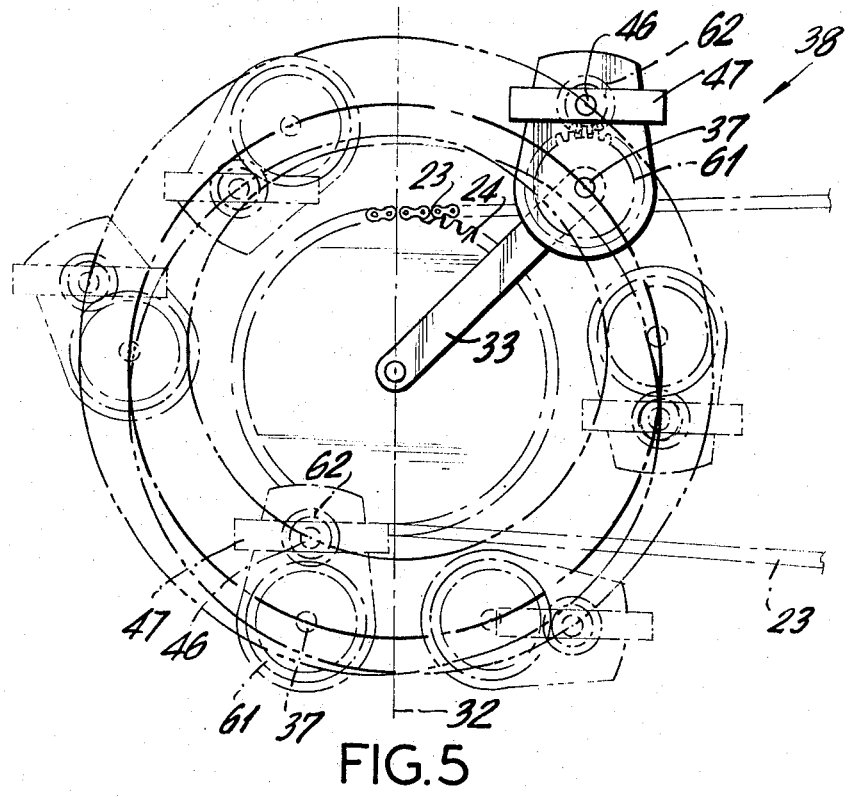
FIGS. 5 - 7 are respective pictorial diagrams illustrating the shapes of the pedal paths of a vehicle employing three alternative pedal assemblies in accordance with the invention.

FIGS. 5 – 8 indicate some alternative forms of gear arrangements for the pedal assembly 38, together with the corresponding changes in the configurations of the resulting pedal paths. In FIG. 5, for example, a 2 : 1 gear ratio is established by a pair of gears 61 and 62 which respectively replace the 1 : 1 gears 51 and 52 in the arrangement of FIG. 2. The larger gear 61 (FIG. 5) is affixed to the shaft 37 associated with the crank 33, while the smaller gear 62 is affixed to the shaft 41 associated with the pedal 47. In this scheme, the pedal path is a more complex spiral pattern than that of FIGS. 3 and 4, with three turns of the crank being required to trace out a complete repetitive pattern of the spiral.

In such FIG. 5 (as well as in FIGS. 6 and 7 to be described) the axis of symmetry of the pedal path curve can be rotated with respect to the vertical axis 32 by altering the aspect angle of the pedal 47 in the manner described above.

Figure 6:
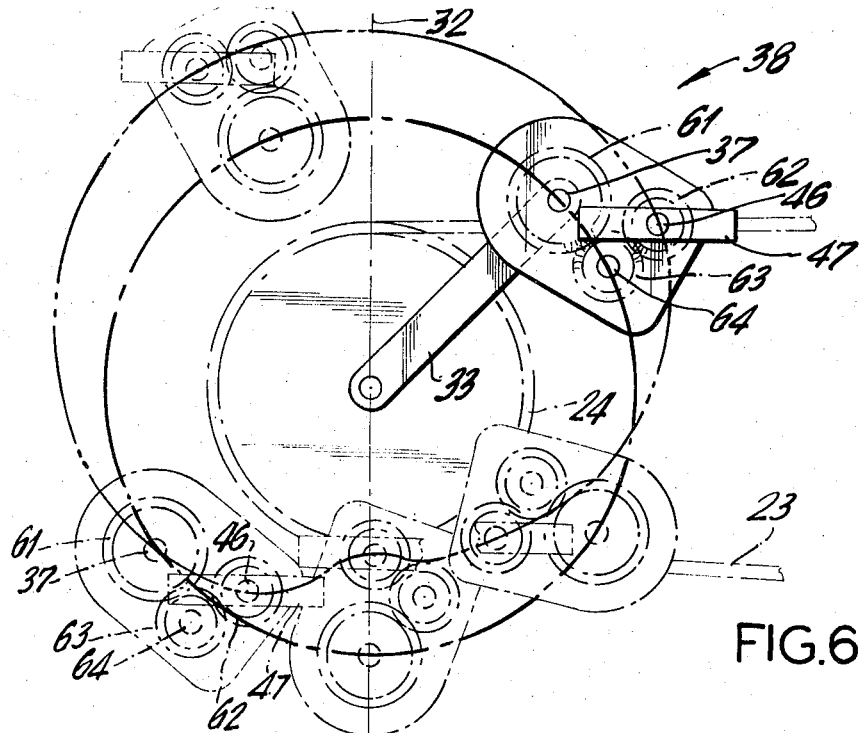

In FIG. 6 the assembly 38 includes, as in FIG. 5, the pair of 2 : 1 gears 61 and 62 respectively carried on shafts 37 and 41. In the case of FIG. 6, however, the gears 61 and 62 are not directly meshed. Instead, an idler gear 63 is rotatably mounted on an intermediate shaft 64 disposed in parallel spaced relation with the shafts 37 and 41. The gear 63 is in meshing relation with both gears 61 and 62, and its size corresponds with that of gear 62. In this case, the pedal path traces out a cardioidal-circular path whose effective center is displaced from the center of rotation of the crank 33.

Figure 7:
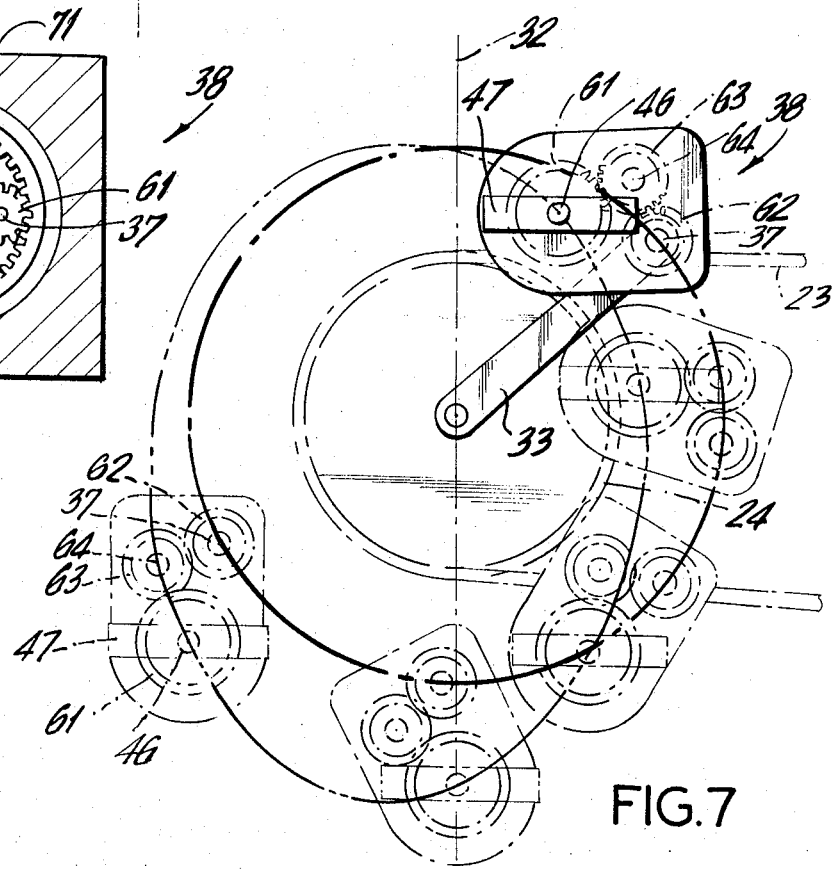

In the modification of FIG. 6 shown in FIG. 7, the larger gear 61 is mounted on the pedal shaft 41 and the smaller gear 62 is mounted on the shaft 37 affixed to the crank 33, so that a 1 : 2 gear ratio is provided. In this case, the curve traced out by the pedal 47 is an elliptical path whose center is displaced from the center of rotation of the crank 33.

Figure 8:
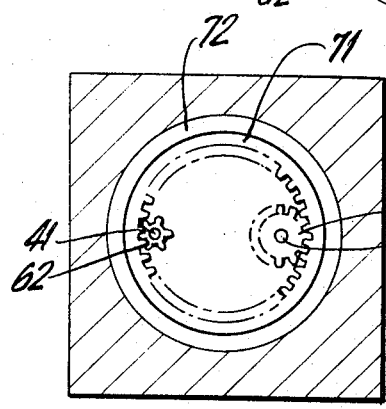
FIG. 8 is a sectional view illustrating still another pedal assembly in accordance with the invention.

FIG. 8 shows an embodiment of the assembly 38 which corresponds functionally to the arrangement of FIG. 6, and therefore yields a displaced cardioidal circle for the pedal path. In the case of FIG. 8, the 2 : 1 gears 61 and 62 mounted on the respective shafts 37 and 41 are not directly meshed, but are disposed in meshing relation with spaced portions of the toothed internal periphery of a ring gear 71. The ring gear, which takes the place of the idler gear 63 of FIG. 6, is mounted for rotation in a suitable bearing 72. While not specifically indicated, the arrangement shown in FIG. 8 may be modified (e.g., by suitable repositioning of the shafts 37 and 41) so that the gears 61 and 62 may be transposed between such shafts while maintaining a meshing relationship with the ring gear 71. The resulting pedal path pattern in this case will have the elliptical shape of FIG. 7.

While the description of the invention given above has been keyed particularly to the motion-changing assembly on only one side of the vehicle (i.e., that on the right side of the operator), it will be understood that a complementary pedal assembly may be employed on the opposite side of the vehicle.

It will be further appreciated that the assembly 38 may be employed as a retrofit kit which can be easily installed on an existing bicycle by removing from the latter the pedal spindle normally threaded into the hole at the end of the crank, and by threading in the shaft projection 36 of the assembly 38. The pedal 47 may then be attached to the shaft projection 46. With this scheme, any desired initial angular position of the pedal may be pre-set during such assembly by employing a washer or other spacing device of suitable thickness on the projection 36.

In the foregoing, the invention has been described in connection with preferred arrangments thereof. Many variations and modifications will now occur to those skilled in the art. It is accordingly desired that the scope of the appended claims not be limited to the specific disclosure herein contained.

What is claimed is:

1. In a pedal-driven vehicle having a rotatable main drive axle and a crank secured on one end to the main axle:
  a housing;
  first and second shafts rotatably mounted in the housing in parallel spaced relation and having respective first ends projecting through the housing;
  means disposed in the housing for rotatably coupling the first and second shafts;
  means for securing the projecting first end of the first shaft to the opposite end of the crank; and
  means for securing the pedal to the projecting first end of the second shaft.

2. Apparatus for coupling a pedal to a crank secured at one end to a rotatable main drive axle of a foot-powered vehicle, which comprises:
  a housing;
  first and second shafts rotatably mounted in the housing in parallel spaced relation and having respective first ends projecting through the housing;
  a first externally toothed gear coaxially secured to the first shaft within the housing;
  a second externally toothed gear coaxially secured to the second shaft within the housing;
  means disposed within the housing for coupling the first and second gears in driving relation;
  means for securing the projecting first end of the first shaft to the opposite end of the crank; and
  means for securing the pedal to the projecting first end of the second shaft.

3. Apparatus as defined in claim 2, in which the coupling means comprises means for directly meshing the teeth of the first and second gears.

4. Apparatus as defined in claim 3, in which the gear ratio of the first and second gears is 1 : 1.

5. Apparatus as defined in claim 3, in which the gear ratio of the first and second gears is 2 : 1.

6. Apparatus as defined in claim 2, in which the teeth of the first and second gears are spaced from each other, and in which the coupling means comprises, in combination,
  a third shaft rotatably mounted in the housing in parallel spaced relation with the first and second shafts;
  a third gear having an externally toothed periphery and coaxially secured to the third shaft; and
  means for individually and directly meshing the teeth of the first and second gears with spaced portions of the toothed periphery of the third gear.

7. Apparatus as defined in claim 6, in which the ratio of the first and second gears is 2 : 1.

8. Apparatus as defined in claim 6, in which the ratio of the first and second gears is 1 : 2.

9. Apparatus as defined in claim 2, in which the respective first ends of the first and second shafts project in respectively opposite directions through the housing.

10. Apparatus as defined in claim 2, in which the teeth of the first and second gears are spaced from each other, and in which the coupling means comprises, in combination,
  an annular third gear rotatably mounted in the housing in surrounding relation with the first and second shafts and having a toothed inner periphery, the third gear being positioned such that the teeth of the first and second gears individually mesh with spaced portions of the toothed periphery of the third gear.

11. In an exercise bicycle, a motion-changing mechanism for connecting a pedal with a crank secured at one end to a rotatable main drive axle of the bicycle, which comprises:
  a housing;
  first and second shafts rotatably mounted in the housing in parallel spaced relation and having respective first ends projecting through the housing;
  means for securing the opposite end of the crank to the projecting first end of the first shaft;
  means for securing the pedal to the projecting first end of the second shaft;
  a first externally toothed gear coaxially secured to the first shaft within the housing;
  a second externally toothed gear coaxially secured to the second shaft within the housing; and
  means disposed in the housing for coupling the first and second gears in driving relation, whereby the pedal is movable in a complex curvilinear path having a prescribed plane of symmetry that is variable by rotating the second shaft about its own axis.

* * * * *